Patented Apr. 15, 1924.

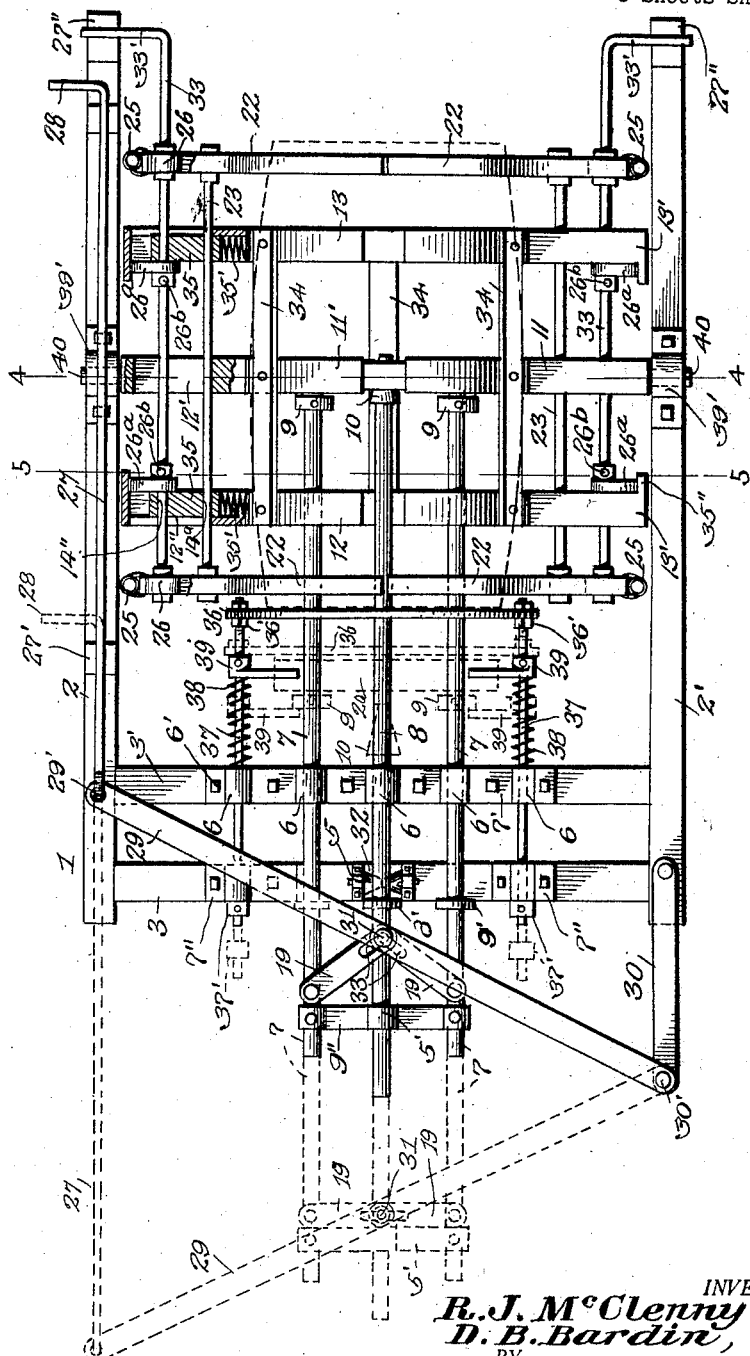

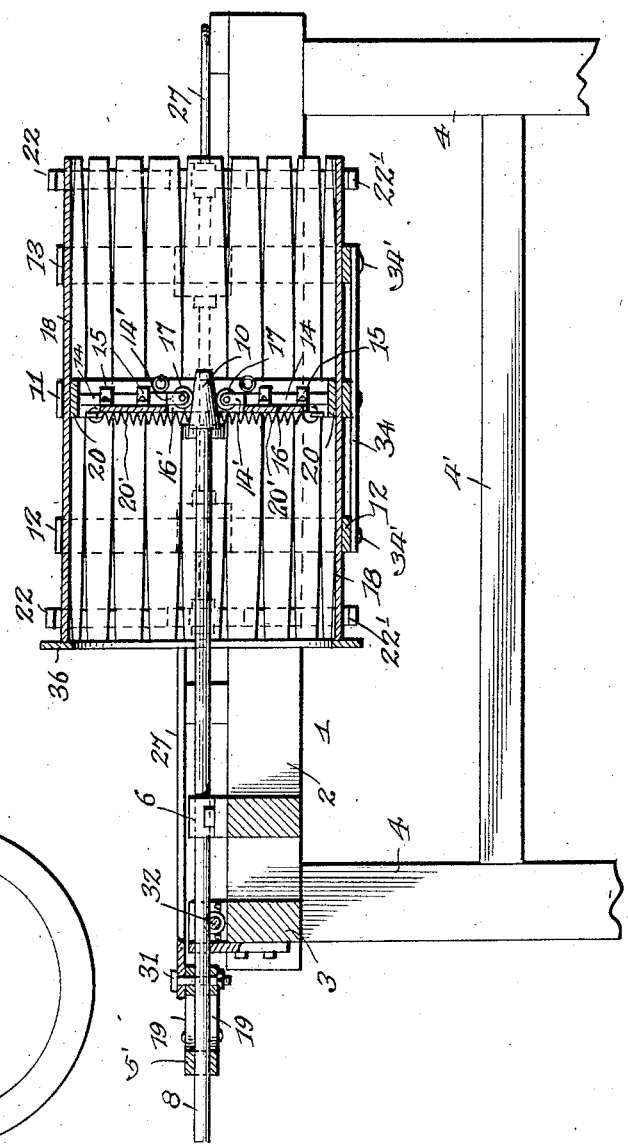

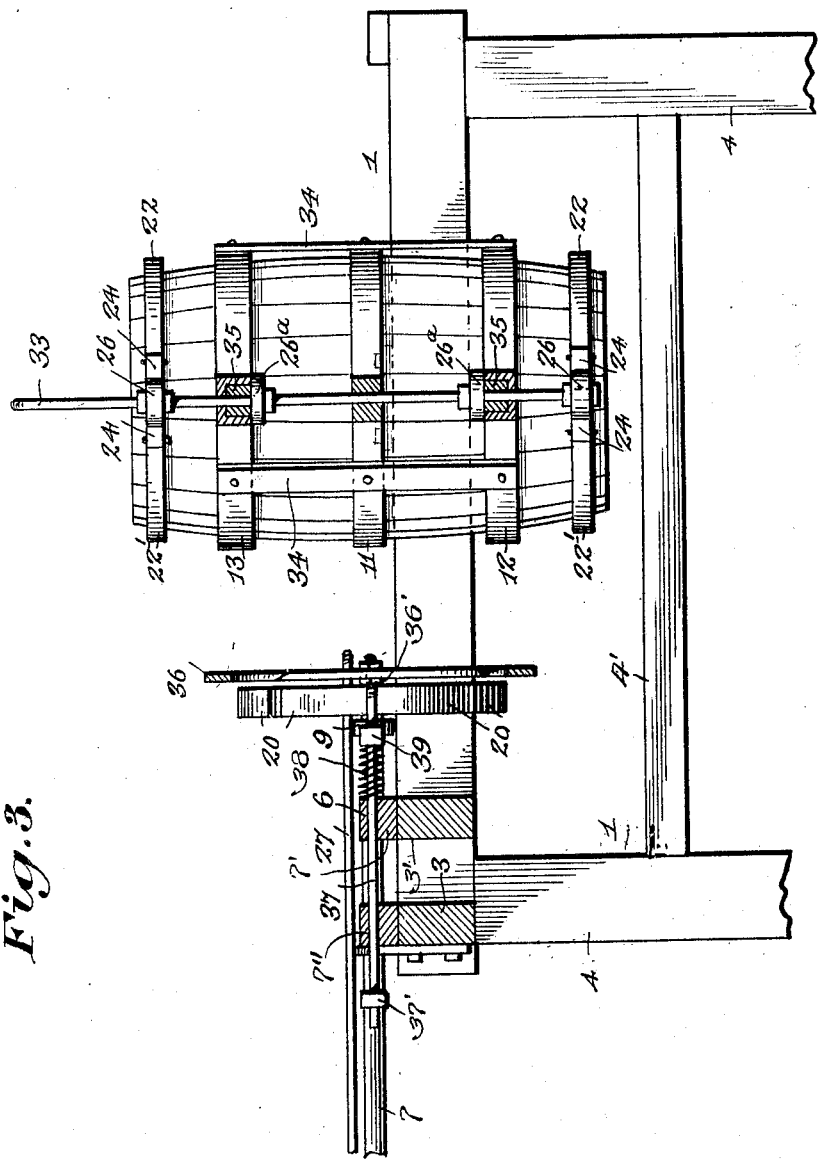

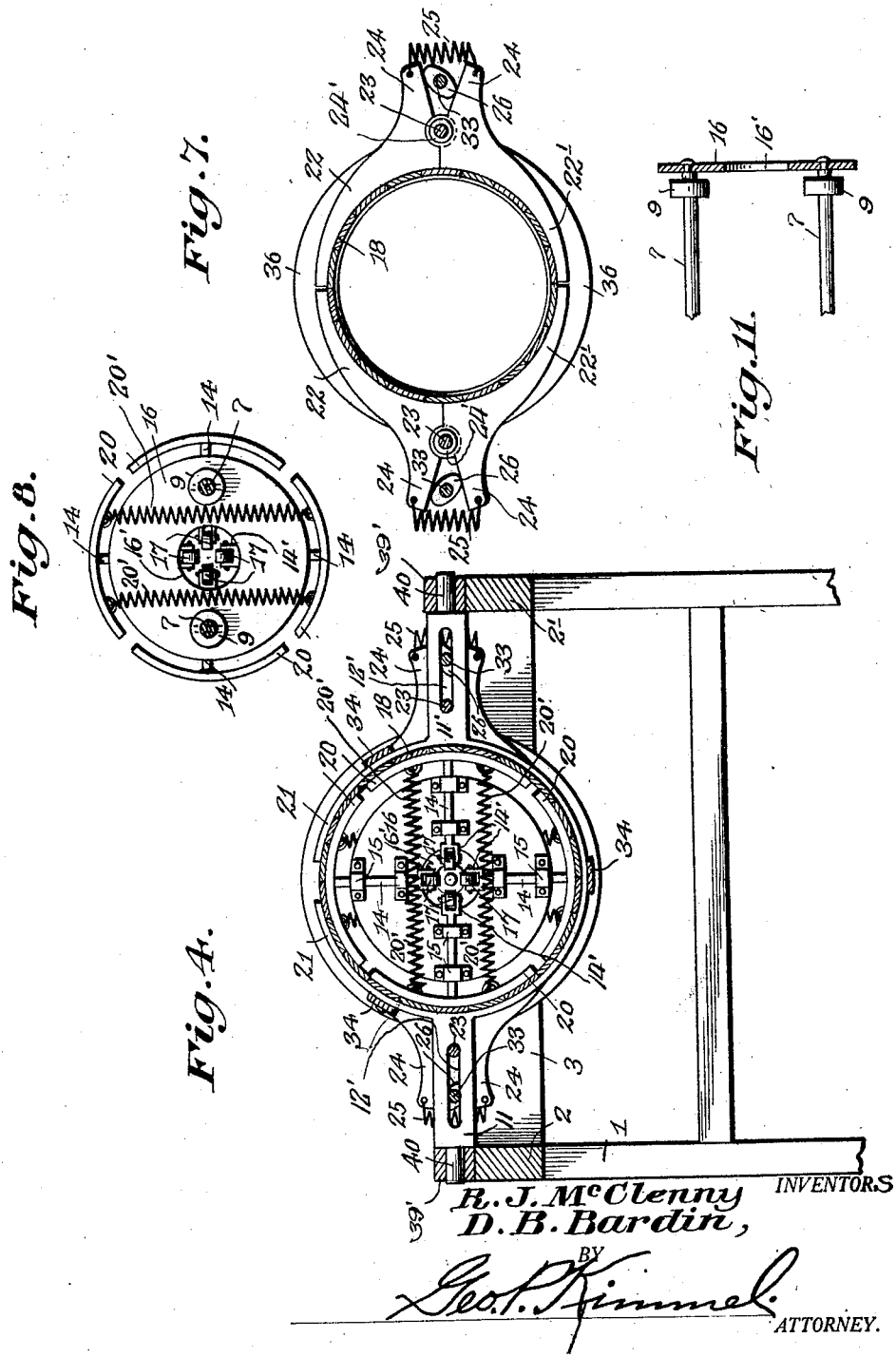

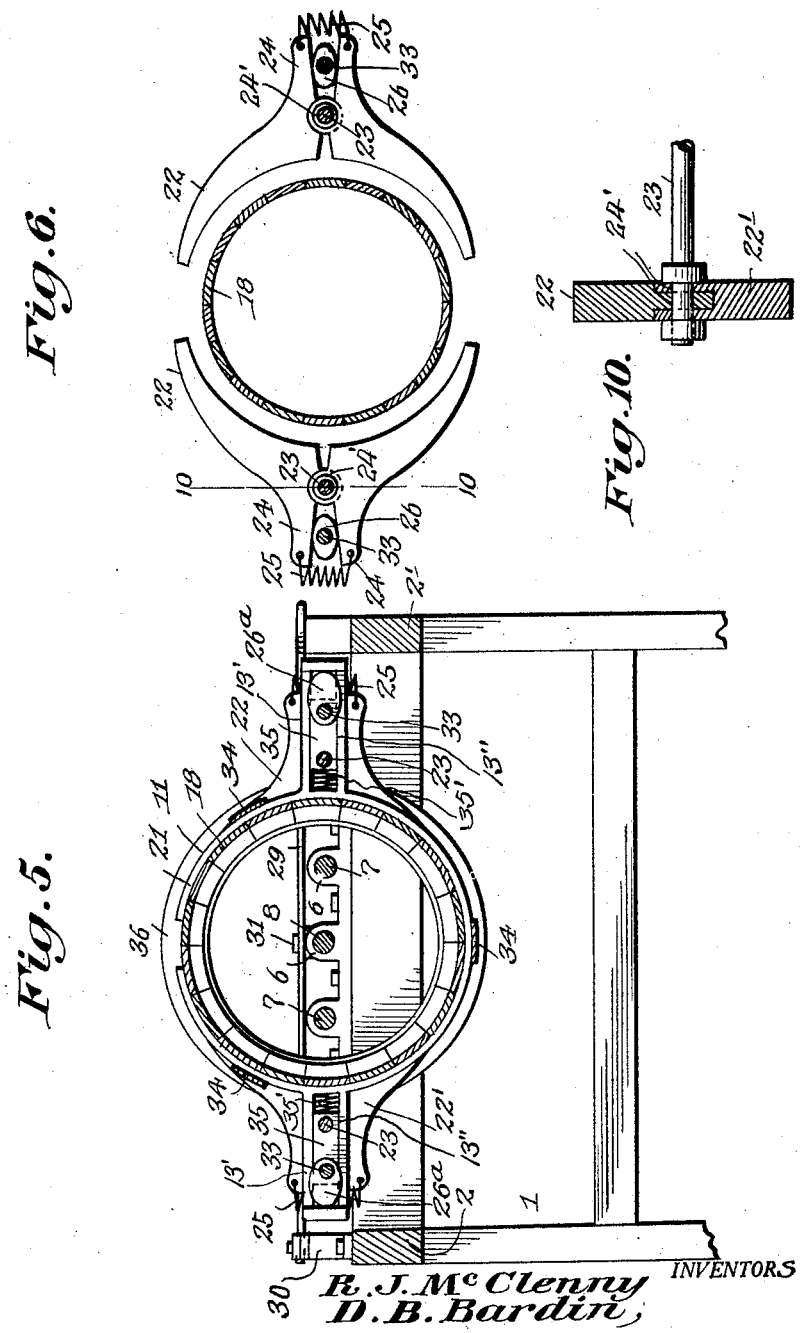

1,490,778

UNITED STATES PATENT OFFICE.

ROBERT J. McCLENNY AND DAVID B. BARDIN, OF EAST PALATKA, FLORIDA, ASSIGNORS TO NU-WAY BARREL AND MACHINERY CO., INC., OF ST. LOUIS, MISSOURI.

BARREL-ASSEMBLING MACHINE.

Application filed May 3, 1922. Serial No. 558,085.

*To all whom it may concern:*

Be it known that we, ROBERT J. McCLENNY and DAVID B. BARDIN, citizens of the United States, residing at East Palatka, in the county of Putnam and State of Florida, have invented certain new and useful Improvements in Barrel-Assembling Machines, of which the following is a specification.

This invention has reference to barrel setting up machines and its object is to provide a machine in which the barrel may be assembled and the hoops and the heads may be applied.

The barrel machine comprises a suitable frame work carrying hoops in which are lodged a suitable number of staves, constituting the body of the barrel, and these hoops are so arranged as to sustain the staves preliminarily in cylindrical form.

The invention comprises an expansible ring determining the central portion of the barrel, and other rings on the opposite sides of the central ring determining the bilge of the barrel, and the end portions of the barrel and capable of construction to closely embrace the head receiving portions of the barrel.

The staves are formed in the usual manner, tapering toward the ends so that when the hoops are finally positioned, the barrel has a central bulged portion and contracted ends.

In the machine, the assembled barrel contains the usual arrangement of staves with the barrel contracting toward the head ends and the heads entered in place in the customary manner with the hoops applied, retaining the staves in place with the heads properly located, provision being made for turning the barrel about a transverse axis while the assembling acts are carried out.

The invention will be best understood from a consideration of the following detailed description, taken in connection with the accompanying drawings forming a part of this specification, with the understanding that the invention is not confined to any particular conformity to the showing of the drawings and may be changed and modified so long as such changes and modifications mark no material departure from the salient features of the invention as expressed in the appended claims.

In the drawings:—

Figure 1 is a top plan view of the machine with certain of the elements thereof shown in dotted lines in inoperatve position.

Fig. 2 is a central vertical longitudinal section of the machine,

Fig. 3 is a longitudinal section of the machine with the barrel turned and the abutment head for the barrel withdrawn to permit the barrel to be released, Fig. 4 is a transverse section on the line 4—4 of Fig. 1, Fig. 5 is a transverse section on the line 5—5 of Fig. 1, Fig. 6 is a detail of the clamping arms in the released position, Fig. 7 is a view of the clamping arms in the clamping position, the barrel being shown in transverse section, Fig. 8 is a detail section of the expander located midway of the length of the barrel, Fig. 9 is a detail view of the abutment head, Fig. 10 is a detail section on the line 10—10 of Fig. 6, and, Fig. 11 is a detail section of the guide rods.

Referring to the drawings, a barrel assembling machine in accordance with this invention includes an open front frame 1, and which is constructed from a pair of spaced longitudinal beams 2, 2', each mounted on a pair of spaced standards 4. A longitudinal brace 4' is secured between each pair of standards in proximity to the lower end thereof. The longitudinal beams 2, 2', have arranged therebetween, at the rear end thereof, a pair of spaced transversely extending cross beams 3, 3', and which are flush with the top edges of the beams 2.

Mounted on the top of beam 3', and secured in position by the hold-fast devices 6', is a metallic strip 7' formed with a series of upwardly extending combined guide and bearing portions 6, and which will be termed guides. The guides are five in number and one is arranged centrally of the beam 3' and is termed a center guide, two are arranged between the center of the strip 7' and the ends thereof, and which are termed the intermediate guides, and the remaining two are positioned in proximity to the ends of the strip 7' and are termed the outer guides.

Mounted on the cross beam 3, and in alignment with the outer guides on the cross beams 3' are bearing brackets 7" which constitute stops, in a manner as hereinafter referred to, and which also provide guides for elements to be hereinafter set forth.

Secured to the top of the cross beam 3, is a pair of spaced brackets 5, in which is journaled a conoidal-shaped or double cone friction roller 32 and which is in alignment with the center guide on the cross beam 3'.

Arranged over the cross beam 3 and extending through the intermediate guides and towards the front end of the frame 1, is a pair of longitudinally extending cylindrical rods 7, each having its front end provided with a head 9. Each of the rods 7, in proximity to its inner end, is provided with a stop collar 9' adapted to abut against the cross beam 3 to arrest movement of the rods 7 towards the front of the frame 1. The rear ends of the rods 7 are connected together by a cross piece 9", provided centrally with a bearing 5'.

Slidably mounted on the roller 32, extending through the bearing 5' and also through the center guide, is a longitudinally extending cylindrical plunger rod 8, having its front end formed with a cone-shaped head 10, which projects forwardly with respect to the heads 9. The rod 8 has its rear portion provided with a stop collar 8', adapted to engage the cross beam 3 to limit the forward movement thereof. The plunger rod 8 constitutes what may be termed an expander element for a purpose to be hereinafter referred to.

Projecting rearwardly from the rear end of the longitudinal beam 2', is a link 30, which has pivotally connected to the rear end thereof, as at 30', an operating lever 29, which has a pin and slot connection, as at 31, 33, with a pair of toggles 19, which are pivotally connected to the rods 7, in proximity to the cross piece 9". The operating lever 29 extends from the cross beam 2' to the cross beam 2, and has connected therewith, as at 29', an operating rod 27, which is arranged over the beam 2, and is arranged on vertically disposed supports 27', carried by the beam 2. The front end of the rod 27 is provided with a handle 28. When the rod 27 is shifted rearwardly, in a manner as indicated in dotted lines in Figure 1, the lever 29 assumes the position shown in dotted lines Figure 1, whereby the rods 7 and 8 are shifted rearwardly, but with the rod 8 shifted rearwardly to a greater extent than the rearward shifting of the rod 7, as shown in dotted lines in Figure 1. When the rod 27 is moved towards the front of the frame 1, the rods 7 and 8 assume the position shown in full lines and with the forward movement of said rods 7 and 8 arrested by the collars 8', 9', abutting against the cross beam 3.

Supported upon a pair of longitudinally extending bars 37, is a vertically disposed abutment head, in the form of a flat annulus, and which is indicated at 36 and is secured by the hold-fast devices 36' to the front ends of the bars 37. The rods 7 and 8 extend through the abutment head 36, and are of materially less length than the rods 7, 8, whereby these latter will project forwardly from the abutment head 36. The bars 37 are slidably mounted in the outer guides 6 and bearings 7", and the rear end of each of the bars 37 is provided with a stop collar 37' engageable with the cross beam 3 for limiting the movement of the bars 37 towards the front end of the frame 1. Each of the bars 37 has secured thereto, an inwardly extending arm 39, and the said arms 39 are arranged in the path of the heads 9 so that on a rearward movement of the rods 7, the heads 9 will abut against the arms 39 and shift the abutment head 36 rearwardly to the position shown in dotted lines in Figure 1. The rearward movement of the bars 37 is had against the action of a pair of coiled springs 38, which are mounted on the bars 37 and are interposed between the cross beam 3' and the arms 39, and said springs 38 under normal conditions shift the bars 37 forwardly until such movement is arrested by the stops 37' engaging with the cross beam 3.

Secured to the top edge of the longitudinal beam 2, as well as to the top edge of the longitudinal beam 2', at a point between the transverse center and the front end thereof, is a bearing bracket 39' and in each of said brackets 39' is journaled a short shaft 40 which extends in a transverse direction with respect to the frame 1, and which provides a rotatable supporting means for a barrel body former device including central, outer, and inner circular split former members and which are indicated by the reference characters 11, 12 and 13 respectively.

The former member 11 is secured to the shafts 40, in a manner to be presently referred to, and said former member 11 is maintained in spaced relation with respect to the former members 12 and 13 by a series of spaced longitudinally extending flat tie bars 34, which are secured to the former members by hold-fast devices 34' and which constitute means for connecting the former members together, as well as maintaining them in spaced relation.

Cooperating with the former member 11 is a bodily shiftable expander mechanism and the function of which is to expand the body portion of the barrel so that the staves 18, which form the body of the barrel, will be forced against, as well as being clamped to, the inner face of the former member 11, as clearly illustrated in Figure 4. The expander mechanism comprises a body portion or support in the form of a vertically disposed disk 16, provided with a centrally disposed opening 16′ through which is adapted to operate the cone-shaped head 10, carried on the front end of the plunger rod 8, and the action of said head 10 will be presently referred to. The disk 16 is fixedly secured to the front end of the rods 7, so that when the rods 7 are moved rearwardly, the expander mechanism will be carried therewith. Arranged on the front face of the disk 16, are four pair of spaced retaining brackets 15, and slidably mounted in each pair of retaining brackets 15, is a radially disposed shank 14, having its inner end formed with a yoke 14′ in which is journaled a roller 17. The rollers 17 are arranged at the opening 16′ and in the path of the head 10, so that when the rod 8 moves forwardly, the head 10 engaging the rollers 17 will shift the shanks 14 outwardly.

Secured to the outer end of each of the shanks 14, is a segment shaped expander member 20, and said expander members 20 are so set up as to be arranged in pairs so that the members 20 of one pair will be arranged opposite each other, but will be oppositely disposed with respect to each other. The expander members 20 of one pair are connected together by a pair of spaced coiled springs 20′, arranged at the rear of the disk 16, and the expander members 20 of the other pair are connected togther by a pair of spaced coiled springs 20″ arranged at the front of the disk 16, and by connecting the expander members 20 together through the medium of the coiled springs, the outward shifting of the shanks 14 by the head 10 is had against the action of the coiled springs. The function of the springs which are connected to the expander members 20, is to normally maintain said members in a retracted position.

The former member 11 is connected with the shafts 40, through the medium of a pair of oppositely extending laterally disposed arms 11′, which are formed integral with the member 11 and also with the shafts 40. Each of the arms 11′ is formed with a lengthwise slot 12′ and extending through each slot 12′ is a pivot rod 23, and a cam actuating shaft 33. The purpose of the rod 23 and shaft 33 will be presently referred to. The shaft 33 has its front end provided with a handle 33′ and which constitutes a stop or holding means for a purpose to be hereinafter referred to.

The former member 12, as well as the former member 13, is provided with a pair of oppositely extending laterally disposed arms 13′, each of which has its inner side formed with a socket 13″, in which is mounted a slidable block 35. Arranged within the socket 13″ and bearing against the block 35, is a coiled spring 35′. Each of the arms 13′ is formed with an inwardly extending lug 35″ and also formed with a longitudinally extending slot 12″. Each of the blocks 35, in proximity to its inner end, is formed with a transverse opening 14ª, and in proximity to its outer end with a transverse opening 14″.

Extending through the slot 12′ of each arm 11′, is a shaft 33, which also extends through the openings 14″ of a pair of blocks 35 at one side of the former members 12, 13, and further through the slots 12″ of a pair of arms 13′.

Each shaft 33 is provided with a pair of cams 26ª, retained in position by collars 26ᵇ and which cooperate with the lugs 35″ for the purpose of locking the shaft 33 from movement, as shown in Figure 1, and when the cams 26ª are in engagement with the lugs 35″, the engagement is had against the expansive action of the spring 35′. Each of the shafts 33 is furthermore provided with a pair of cams 26, and the function of said cams 26 will be presently referred to.

Each pivot rod 23, which also constitutes a support, extends through the openings 14ª of a pair of blocks 35 and also through the slots 12′ and 12″. A pivot rod 23 is arranged at each side of the former members 12, 13, as clearly shown in Figure 1.

The rods 23 constitute supports for a series of clamping devices and said clamping devices are arranged in pairs, one pair in advance of the former member 13, and the other pair at the rear of the former member 12. The pair of clamping devices are secured to the ends of the rods 23 and with each end of a rod acting as a pivot for the sections of a clamping device, as well as a means for connecting the sections of a clamping device together. Each clamping device is formed of an upper and a lower curvilinear section 22, 22′ respectively, and with the lower end of the section 22 seating on the upper end of the section 22′, and the said sections of the clamping device are adapted to overlap the barrel body. The lower end of the section 22, as well as the upper end of the section 22′, is provided with an outwardly extending inclined arm 24, and the said arms 24 are oppositely inclined with respect to each other, and between the said arms 24 is positioned the cam 26, and when the shaft 33 is shifted in one direction the cam 26 acting against the arms 24 will shift the sections 22, 22′ to clamping engagement with respect to the barrel body, as shown in Figure 7, but when the shaft 33 is moved in the opposite direction the sections 22, 22′ will shift on their pivots, so that the said sections will move away from each other, due to the action of a coiled spring 25, which is connected to the outer ends of the arms 24. The arms 24 are provided with apertured offset portions 24′ and with the apertures thereof registering. Extending through the registering apertures is the rod 23, for the purpose of connecting the sections 22, 22' together, and also for pivotally mounting them on the rod 23.

The clamping devices of each pair are oppositely disposed with respect to each other, as shown in Figure 7, and are suspended or supported through the medium of the rods 23.

When the shafts 33 are shifted so that the cams 26 will engage the arms 24 to move the sections of the clamping devices to grip the barrel body, the cams $26^a$ engage with the lugs 35'' and lock the shafts 33 in position, as well as locking the sections of the clamping devices in clamping engagement with the barrel body, as clearly shown in Figure 7.

When the shafts 33 are shifted to release the cams 26 from the position shown in Figure 7, that is to say, to move the cams 26, so that the springs 25 can act to open the sections of a clamping device, the cams $26^a$ are moved from engagement with the lugs 35'' and the action of the springs 35' will shift the blocks 35 towards the outer ends of the arms 13', carrying the clamping devices therewith and which will permit of the removal of the barrel.

When the cams $26^a$ are in engagement with the lugs 35'', the handles 33', of the shafts 33 engage the supports 27'', at the front ends of the beams 2, 2', thereby retaining the forming device, as well as the barrel body in a longitudinal position with respect to the frame 1. When the handles 33', are shifted off the supports 27'', the barrel can be swung to the position shown in Figure 3, but the swinging of the barrel to the position shown in Figure 3, is not had until the abutment head is moved rearwardly to the position shown in Figure 3. The barrel when shifted to the position shown in Figure 3 is secured to the clamping devices until the shaft 33 is turned to release the cams.

When the lever 29 is shifted to the position shown in dotted lines, Figure 1, so as to move the rods 7 and 8 rearwardly, the rod 8 is moved rearwardly in advance of the rearward movement of the rod 7.

The staves are arranged within the formers 11, 12 and 13 and between the expander members 20 and the center former 11, and with the staves extended against the abutment head 36. When mounting the staves in position with respect to the former members and expander mechanism, as well as with respect to the abutment head, the clamping devices are in the position as shown in Figure 6. After the body of the barrel has been set up by arranging the staves around the expander members, the shafts 33 are shifted so that the cams $26^a$ will engage the lugs 35'' and shift the clamping devices against the barrel body to the position shown in Figure 7, and during the action of the cams $26^a$, the cams 26 will engage the arms 24 and move the sections of the clamping devices to clamping engagement with the barrel body to the position as illustrated in Figure 7.

After the clamping devices have been shifted to the position shown in Figure 7, the expander mechanism, together with the abutment head is shifted rearwardly to the position shown in dotted lines, Figure 1, and then the barrel is turned on the shafts 40 so that it will assume the position shown in Figure 3, and upon shifting the shafts 33, the several cams can be released, and the barrel removed.

After the body of the barrel has been formed and the heads applied thereto, the end hoops are positioned, and after the end hoops have been positioned the barrel body is removed from the machine and the other hoops forming part of the barrel are mounted in position.

What is claimed is:—

1. A barrel assembling machine comprising a barrel body former device, a longitudinally shiftable expander mechanism movable to position within said former device and including radially movable expander members cooperating with said device, a longitudinally shiftable operating means for said expander mechanism, clamping devices supported from and arranged at the front and rear of said former device, and operating means for said clamping devices supported from said former device.

2. A barrel assembling machine comprising a barrel body former device, a longitudinally shiftable expander mechanism movable to position within said former device and including radially movable expander members cooperating with said device, a longitudinally shiftable operating means for said expander mechanism, clamping devices supported from and arranged at the front and rear of said former device, operating means for said clamping devices supported from said former device, and a longitudinally movable spring controlled abutment head cooperating with the rear of said former device.

3. A barrel assembling machine comprising a barrel body former device, a longitudinally shiftable expander mechanism movable to position within said former device and including radially movable expander members cooperating with said device, a longitudinally shiftable operating means for said expander mechanism, clamping devices supported from and arranged at the front and rear of said former device, operating means for said clamping devices supported from said former device, a longitudinally movable spring controlled abutment head cooperating with the rear of said former device, and means common to said operating means for said expander mechanism and the said expander mechanism and the said abutment head for longitudinally shifting them.

4. A barrel assembling machine comprising a barrel body former device, a longitudinally shiftable expander mechanism movable to position within said former device and including radially movable expander members cooperating with said device, a longitudinally shiftable operating means for said expander mechanism, clamping devices supported from and arranged at the front and rear of said former device, and means supported from said former device for laterally shifting said clamping devices towards the barrel body and further for moving said clamping devices into clamping engagement with the barrel body.

5. A barrel assembling machine comprising a barrel body former device, a longitudinally shiftable expander mechanism movable to position within said former device and including radially movable expander members cooperating with said device, a longitudinally shiftable operating means for said expander mechanism, clamping devices supported from and arranged at the front and rear of said former device, means supported from said former device for laterally shifting said clamping devices towards the barrel body and further for moving said clamping devices into clamping engagement with the barrel body, and a longitudinally movable spring controlled abutment head cooperating with the rear end of the former device.

6. A barrel assembling machine comprising a barrel body former device, a longitudinally shiftable expander mechanism movable to position within said former device and including radially movable expander members cooperating with said device, a longitudinally shiftable operating means for said expander mechanism, clamping devices supported from and arranged at the front and rear of said former device, means supported from said former device for laterally shifting said clamping devices towards the barrel body and further for moving said clamping devices into clamping engagement with the barrel body, a longitudinally movable spring controlled abutment head cooperating with the rear end of the former device, and means common to the operating means for the expander mechanism and to said expander mechanism and to said abutment head for longitudinally shifting them.

In testimony whereof, we affix our signatures hereto.

ROBERT J. McCLENNY.
DAVID B. BARDIN.